United States Patent [19]

Pollard

[11] Patent Number: 5,469,724

[45] Date of Patent: Nov. 28, 1995

[54] FIRE HYDRANT LOCKING DEVICE

[76] Inventor: Jerry K. Pollard, 15 Surrey Trail, Rome, Ga. 30161

[21] Appl. No.: 180,680

[22] Filed: Jan. 12, 1994

[51] Int. Cl.$^6$ ............................................. F16K 35/00
[52] U.S. Cl. ............................ 70/178; 70/180; 70/158; 70/164; 70/DIG. 57; 70/232; 137/296
[58] Field of Search ......................... 70/178, 180, 232, 70/54–56, 158, 14, 163–164, 166–169, 177, 175, 176, 179, DIG. 57; 137/296, 382, 800; 248/552

[56] References Cited

U.S. PATENT DOCUMENTS

| 111,943 | 2/1871 | Jones . | |
|---|---|---|---|
| 307,101 | 10/1884 | Cole | 70/178 |
| 716,204 | 12/1902 | De Waldo | 70/232 |
| 973,624 | 10/1910 | Burley . | |
| 1,714,856 | 5/1929 | Douglas . | |
| 1,830,667 | 11/1931 | Lolley | 70/178 |
| 1,832,057 | 11/1931 | Stein . | |
| 1,920,128 | 7/1933 | Mickler | 70/178 |
| 2,118,233 | 5/1938 | Ruggio | 137/296 |
| 2,377,036 | 5/1945 | Quarfoot | 70/178 |
| 3,406,708 | 10/1968 | Maydock | 70/180 |
| 3,623,498 | 11/1971 | Manahan | 137/296 |
| 4,033,372 | 5/1977 | Bowman | 137/296 |
| 4,257,247 | 3/1981 | Sims | 70/232 |
| 4,484,595 | 11/1984 | Vanek et al. | 137/296 |
| 4,656,848 | 4/1987 | Rose | 70/232 |
| 4,736,765 | 4/1988 | Campbell | 137/296 |
| 5,213,294 | 5/1993 | DeBurd | 248/552 |

Primary Examiner—Darnell M. Boucher
Attorney, Agent, or Firm—Hopkins & Thomas

[57] ABSTRACT

The fire hydrant locking device has a cap (20) enclosing the operating nut (12) of the fire hydrant (6). The cap is secured in place on the top surface of the fire hydrant bonnet (10) by at least one arm (22) extending downwardly over and about the bonnet and extending beyond the fire hydrant barrel mounting flange (9). The lower end of the arm (22) is attached to the flanges (9 and 10') of the barrel (8) and bonnet (10) by bracket (26) and its pad lock (25) so that the cap, arm, and bonnet of the fire hydrant cannot be removed without first removing the fire hydrant locking device. Another locking bracket (80) is received on the outlet cap (17), of the fire hydrant hose outlets (16). Chain (86) is passed through each locking bracket encircling the fire hydrant, whereupon the ends of the chain are pad locked together.

19 Claims, 7 Drawing Sheets

FIRE HYDRANT LOCKING DEVICE

FIELD OF THE INVENTION

This invention relates to locking devices for fire hydrants. More particularly, this invention relates to a fire hydrant locking device which prohibits unauthorized access to and operation of a fire hydrant.

BACKGROUND OF THE INVENTION

Municipal fire hydrants, also known as fire plugs, provide an invaluable and immediate source of water for fire fighters when called upon to respond to fires in either residential, commercial, or industrial structures. In times of emergency, fire hydrants can also provide a secondary source of potable water should the municipal fresh water distribution system become contaminated or inoperable due to a pump station failure. Also, fire hydrants serve as a source of water for municipal sanitation crews when, for example, they are engaged in street cleaning operations.

However, due to the fact that fire hydrants provide a ready and accessible source of clean and fresh water, problems have arisen with theft of water from unmetered fire hydrants. When water is stolen from fire hydrants, not only does the municipality lose the sale of water to an end consumer, such as a residential or commercial user, but the available water supply for use in fighting a fire can be temporarily reduced through reduction in fire water system pressure, or fire water reserves.

Also, municipal fire hydrants are subject to vandalism or theft of parts. In the typical fire hydrant used in the United States, the fire hydrant comprises a generally circular upwardly standing barrel having a mounting flange, to which an arcuate flanged bonnet is bolted. Protruding through the bonnet is an operating nut which can be turned to charge the fire hydrant with water. The operating nut is held within the bonnet by a brass thrust collar. The operating nut is not shielded or enclosed atop the bonnet so that municipal fire departments can gain ready access to the nut in order to turn it for opening an underground water valve to charge the fire hydrant with water. Thus, due to the construction of the fire hydrant and the fact that the operating nut thrust collar is constructed of brass, municipalities have faced problems with individuals improperly removing the brass thrust collars from the fire hydrants with the result that the operating nut does not have the thrust collar to push against, and is thus unable to charge the fire hydrant with water in the event of an emergency. The brass thrust collars are taken to scrap yards or recycling centers, where the brass is sold for its commercial salvage or scrap value.

Attempts have been previously made to prevent the operation of a valve or stop cock, or for locking a cap to an object. For example, U.S. Pat. No. 1,714,856, issued May 28, 1929, to P. S. Douglas discloses a valve locking device which prevents the operation of a valve handle so that the position of the valve gate cannot be altered. In Douglas, this is accomplished through mounting a locking device on the valve body, so that the locking device swings down upon and engages the valve operating wheel with a pair of stops extending downward between spokes of the valve operating wheel. Another early effort to prevent the operation of a valve is disclosed in U.S. Pat. No. 111,943, issued Feb. 21, 1871, to J. Jones, which discloses a bridle and a cap, for locking a stop cock in its seat so that it cannot be tampered with or loosened so as to leak.

U.S. Pat. No. 1,832,057, issued Nov. 17, 1931, to E. G. Stein, and U.S. Pat. No. 973,624, issued Oct. 25, 1910, to M. E. Burley disclose a cap lock, and a locking device for milk can covers, respectively. The patents to Stein, and Burley, however, do not otherwise disclose or teach an apparatus for securing or otherwise shielding an operating nut protruding through a fire hydrant bonnet, or for locking the fire hose outlet(s) of a fire hydrant closed.

None of these known locking devices discloses an apparatus for securing or otherwise enclosing an operating nut of a municipal fire hydrant upon the bonnet of the fire hydrant so that the operating nut cannot be operated, nor can it be tampered with, in order to charge the fire hydrant with water, or to disable the fire hydrant from being charged with water. Nor do any of these known locking devices disclose an apparatus for locking closed the fire hose outlets of a fire hydrant.

SUMMARY OF THE INVENTION

Briefly described, the present invention comprises an apparatus for locking a fire hydrant so that the fire hydrant cannot be improperly operated, vandalized, or have parts stolen therefrom, nor can water be improperly taken from the fire hydrant. This is accomplished through the present invention, which is a locking device for a standard municipal fire hydrant, the fire hydrant having an upright generally circular barrel, a mounting flange upon the upper end of the barrel for removably receiving an arcuate flanged bonnet connected to the barrel, and an operating nut protruding through the bonnet for operating a valve to permit water to charge the fire hydrant.

The fire hydrant locking device of the present invention has a cap for enclosing the operating nut upon the barrel, and at least one arm connected to the cap and extending downwardly from the cap about the bonnet and beyond the barrel mounting flange. A rigid bracket is sized and shaped to be removably received upon the barrel of the fire hydrant and removably receives the arm or arms extending downwardly from the cap. The locking device also has a pad lock, or the like, where the lock secures the arm to the bracket.

The fire hydrant locking device also has a bracket, or brackets, received on the outlet cap, or caps, respectively, of the fire hydrant's hose outlets. Each bracket has a locking chain passed therethrough so that the locking chain encircles the fire hydrant. The fire hydrant locking device also has a lock for locking the locking chain, and thus the fire hose outlet caps, on the fire hydrant.

Therefore, it is an object of the present invention to provide an improved locking device for a fire hydrant which encloses the operating nut of the fire hydrant so that the fire hydrant can be operated only by authorized personnel.

Another object of the present invention is to provide a fire hydrant locking device which will discourage theft of water from the fire hydrant.

It is another object of the present invention to provide a fire hydrant locking device which will protect the fire hydrant, and in particular protect the operating nut and the thrust collar surrounding the operating nut, from vandalism or destruction so as to avoid disabling of the fire hydrant.

It is a further object of the present invention to provide a fire hydrant locking device which is simple in design and inexpensive to construct, is durable and rugged in structure, and can be easily fit or retrofit to new and existing municipal fire hydrants.

It is still another object of the present invention to provide a fire hydrant locking device which secures and protects the operating nut of the fire hydrant, but which can be removed quickly and easily when access is needed for municipal use of the fire hydrant.

These and other objects, features, and advantages of the invention will become apparent upon reading the specification when taken in conjunction with the accompanying drawing wherein like characters of reference designate corresponding parts throughout the several views.

DETAILED DESCRIPTION OF THE PREFERRED EMBODIMENT

Figure 1:
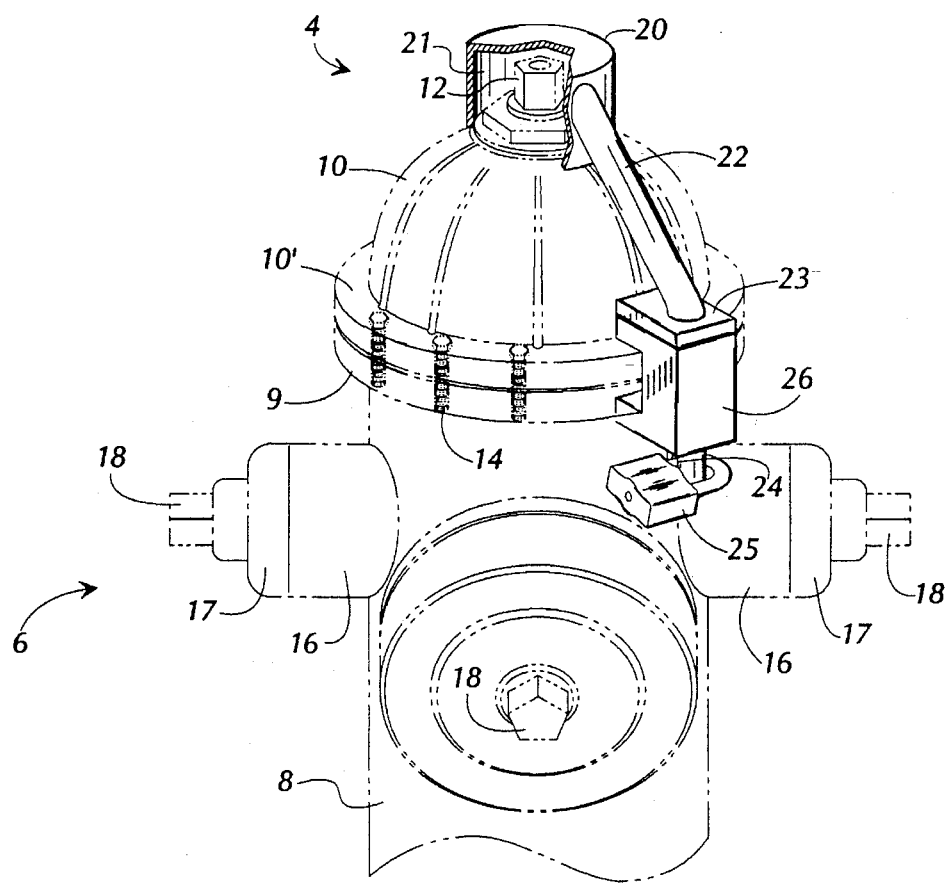
FIG. 1 is a perspective view in partial cut-away of a first version of the preferred embodiment of the fire hydrant locking device.

Referring now in more detail to the drawings, in which like reference numerals indicate like parts throughout the several views, numeral 4 in FIG. 1 refers to a first embodiment of the fire hydrant locking device secured to a fire hydrant 6, where fire hydrant 6 is a standard municipal fire hydrant used in the United States. Fire hydrant 6 includes a generally upright cylindrical barrel 8, which functions as the body of the fire hydrant. Formed at the upper end of barrel 8, is barrel mounting flange 9 having a plurality of bolt holes (not illustrated) defined therein for securing a flanged arcuate or domed bonnet 10 to barrel mounting flange 9 with flange bolts 14. Fire hydrant 6 also comprises at least one fire hose outlet 16, having an outlet cap 17 threadedly received thereon, with turning nut 18 connected to, or otherwise formed on, outlet cap 17. A standard municipal fire hydrant 6 in the United States is typically made of cast iron.

Figure 2:
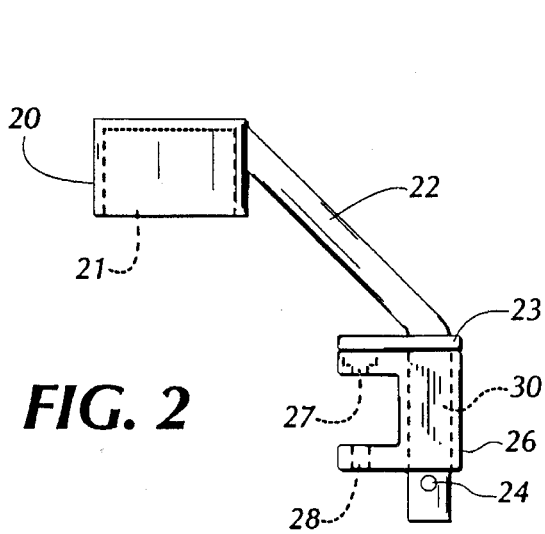
FIG. 2 is a side elevational view of the fire hydrant locking device illustrated in FIG. 1.
Figure 3:
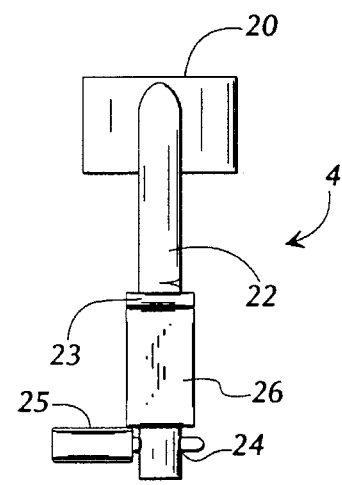
FIG. 3 is a rear elevational view of the fire hydrant locking device illustrated in FIG. 1.

Still referring to FIG. 1, fire hydrant locking device 4 includes cap 20 which rests on the upper surface of bonnet 10 and encloses operating nut 12 on the bonnet. Cap 20 has a hollow portion 21, either formed or machined therein for enclosing operating nut 12 on bonnet 10. As illustrated in FIGS. 1 through 3, arm 22 is attached to cap 20 and extends downwardly toward barrel 8, passing downwardly and about bonnet 10 and beyond barrel mounting flange 9. Arm 22 has a horizontal tamper shield 23 connected thereto or formed thereon, perpendicular to arm 22, which rests upon and encloses the top surface of locking bracket 26.

Referring now to FIGS. 1 and 2, locking bracket 26 is constructed as a C-shaped bracket which passes over and rests on the upper surface of bonnet flange 10' of bonnet 10, and the lower surface of-barrel mounting flange 9, and is attached to flanges 9 and 10' by a furnished, extra length, stainless steel bolt and nut. As best shown in FIG. 2, flange bolt 14 passes through recessed flange bolt opening 27 formed or machined in locking bracket 26, extends through flanges 10' and 9, illustrated in FIG. 1, and is then received within bottom bolt opening 28, also formed or machined within locking bracket 26. Bottom bolt opening 28 is sized large enough to permit a nut to be passed therethrough for securing flange bolt 14 to both flanges 10' and 9, and locking bracket 26. In this manner, locking bracket 26 is secured upon fire hydrant 6, and tamper shield 23 of arm 22 will enclose and prevent access to recessed flange bolt opening 27 when arm 22 has been placed through longitudinal passage 30 defined within locking bracket 26.

Referring now to FIG. 3, as arm 22 is passed through locking bracket 26, the free end 22' of arm 22 extends through the bottom of locking bracket 26, so that lock hole 24 is exposed below locking bracket 26 on that portion of arm 22 extending therethrough. Thereafter, lock 25, which can be, for example, either a conventional padlock or combination lock, is passed through lock hole 24, thereby securing cap 20, arm 22, and locking bracket 26 to fire hydrant 6. In this manner, neither fire hydrant locking device 4, nor bonnet 10 can be removed from barrel 8 of fire hydrant 6 in order to gain access to operating nut 12, or the brass thrust collar (not illustrated) surrounding operating nut 12 within bonnet 10.

In this embodiment of the invention, fire hydrant locking device 4 is placed on fire hydrant 6 by first bolting locking bracket 26 to bonnet flange 10' and barrel mounting flange 9 as described above. Once locking bracket 26 is secured to fire hydrant 6, the integrated assembly having cap 20, arm 22, and tamper shield 23 is lowered onto the bonnet of fire hydrant 6 so that cap 20, and in particular hollow portion 21 of cap 20, rests on the outer surface of bonnet 10 and fully encloses operating nut 12. Arm 22 is received within longitudinal passage 30, illustrated in FIG. 2, of locking bracket 26, and extends therethrough, see FIG. 3, and is thereupon locked in place with pad lock 25. Once in its locked position, neither fire hydrant locking device 4, nor bonnet 10 can be removed from fire hydrant 6.

Fire hydrant locking device 4 is constructed of mild steel. It is anticipated that fire hydrant locking device 4 could also be made out of high carbon or hardened steel, or stainless steel, dependent upon the customer's needs and the conditions to which fire hydrant locking device 4 will be exposed during its service life. If, for example, fire hydrant locking device 4 is installed upon municipal fire hydrants in an ocean front setting, the municipality installing fire hydrant locking device 4 on its fire hydrants may wish to purchase a stainless steel locking device which would be resistant to rust and corrosion. Although it is possible that in its mild steel or hardened steel construction that fire hydrant locking device 4 could be painted or externally coated, it is not anticipated that any such external finish will be necessary in order to otherwise enhance or prolong the service life of fire hydrant locking device 4.

Fire hydrant locking device 4 is shown here as an assembly of mild steel parts which have been machined or formed to shape and welded together, where appropriate, so that the fire hydrant locking device fits together as illustrated in its several views. Those skilled in the art will recognize that the components of fire hydrant locking device 4 can also be made of cast iron, or can be forged from steel bar stock. The ultimate factor in determining of what material the fire hydrant lock device is fabricated will depend on the local environment and conditions in which the locking device will be used.

Figure 4:
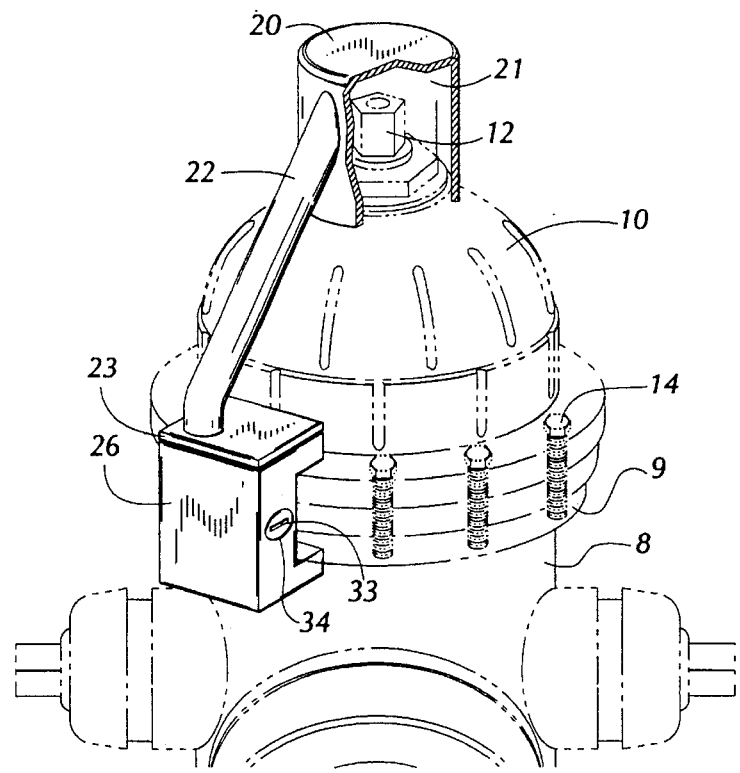
FIG. 4 is a perspective view in partial cut-away of a second fire hydrant locking device.
Figure 5:
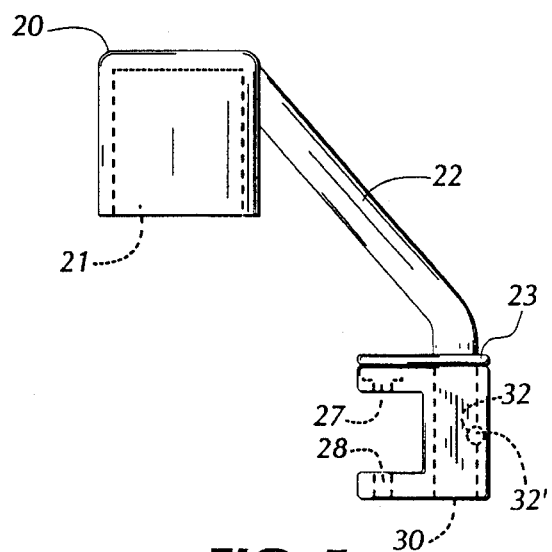
FIG. 5 is a side elevational view of the fire hydrant locking device illustrated in FIG. 4.
Figure 6:
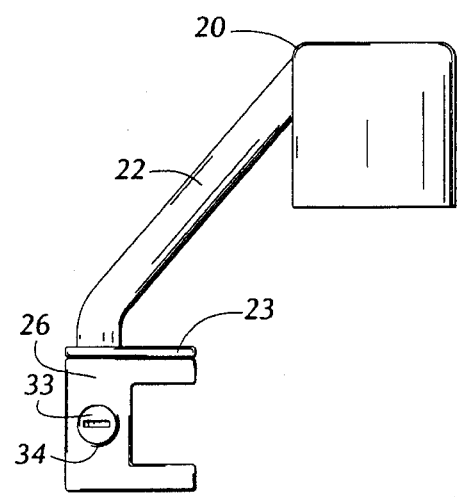
FIG. 6 is an opposite side elevational view of the fire hydrant locking device illustrated in FIG. 5.

Referring now to FIGS. 4 through 6, a second embodiment of fire hydrant locking device 4 is illustrated. The embodiment of fire hydrant locking device 4 illustrated in FIG. 4 has a cap 20 with a hollow portion 21 formed therein and is connected to arm 22. Arm 22 again has tamper shield 23 connected thereto, whereupon arm 22 passes into locking bracket 26 through longitudinal passage 30, and is received within locking bracket 26 but does not otherwise extend therethrough. Unlike the first embodiment of fire hydrant locking device 4 illustrated in FIGS. 1 through 3, this embodiment of fire hydrant locking device 4 does not utilize a lock 25, but rather has a key operated lock assembly 33 received within locking bracket 26 through lock assembly opening 34. A key operated lock assembly of the type which will suffice for the purposes of my invention is disclosed in U.S. Pat. No. 2,996,909 to J. J. Gage, incorporated herein by this reference.

Referring now to FIG. 5, that portion of arm 22 which passes into locking bracket 26 through longitudinal passage 30 has a notch 32 formed therein which is one-half of a circle, the circle being of the same diameter as key operated lock assembly 33. The second or opposing half of notch 32 is notch portion 32', illustrated in FIG. 5, formed within locking bracket 26. As illustrated in FIG. 6, when key operated lock assembly 33 is placed within locking bracket 26, the entirety of key operated locking assembly 33 is enclosed, and locked, within locking bracket 26.

Figure 7:
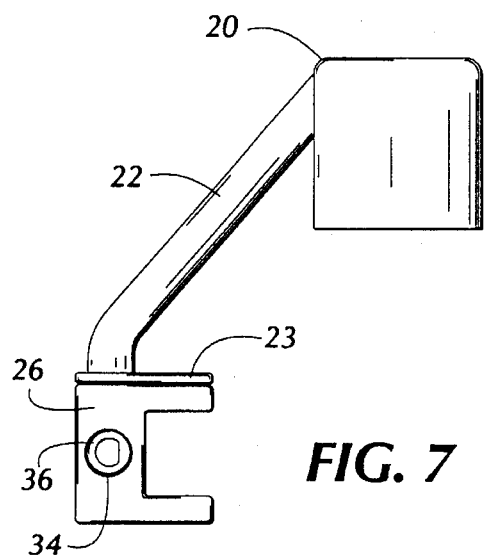
FIG. 7 is a side elevational view of a third fire hydrant locking device.

A third embodiment of fire hydrant locking device 4 is shown in FIG. 7. In this embodiment of the fire hydrant locking device, a locking bolt 36 is used in lieu of key operated lock assembly 33 within a locking device otherwise identical to that disclosed in FIGS. 4 through 6. In this embodiment of the fire hydrant locking device, locking bolt 36 has an external thread and is threaded into lock assembly opening 34, defined within locking bracket 36, and passes into and through both arm 22, along threaded notch 32, and locking bracket 26 along threaded notch portion 32' as illustrated in FIG. 5.

Figure 8A:
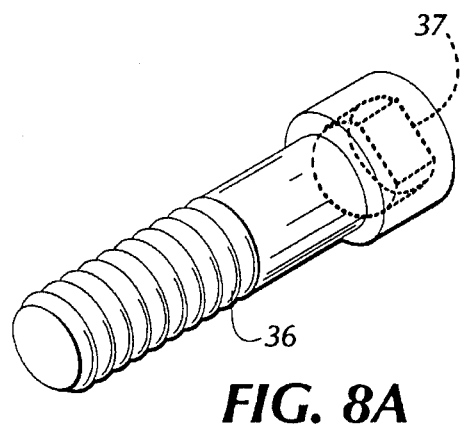
FIG. 8A is a top plan view of the locking bolt used in the fire hydrant locking device illustrated in FIG. 7.
Figure 8B:
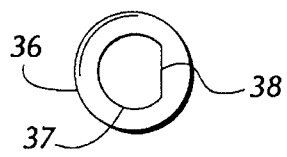
FIG. 8B is a perspective view of the locking bolt used in the fire hydrant locking device illustrated in FIG. 7.
Figure 8C:
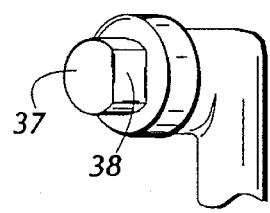
FIG. 8C is a perspective view of the matching tool used to operate the locking bolt of the fire hydrant locking device illustrated in FIG. 7.

As seen in FIGS. 8A and 8C, locking bolt 36 has a recessed opening 37 which has a flat portion 38 formed therein, and is constructed so that a special tool having a matching shape, matching tool 39, illustrated in FIG. 8C, is needed in order to fit in recessed opening 37 for either tightening locking bolt 36 in, or removing locking bolt 36 from, locking bracket 26 of fire hydrant locking device 4.

FIG. 8C shows matching tool 39 which would be carried by the municipal crews having need to access the operating nut upon fire hydrant 6. Matching tool 39 is placed within recessed opening 37 and is sized and shaped to be received snugly within recessed portion 37, as well as flat portion 38, so that matching tool 39 can readily and quickly install or remove locking bolt 36 from fire hydrant locking device 4. Matching tool 39 is constructed in one piece, and is made of steel.

Figure 9:
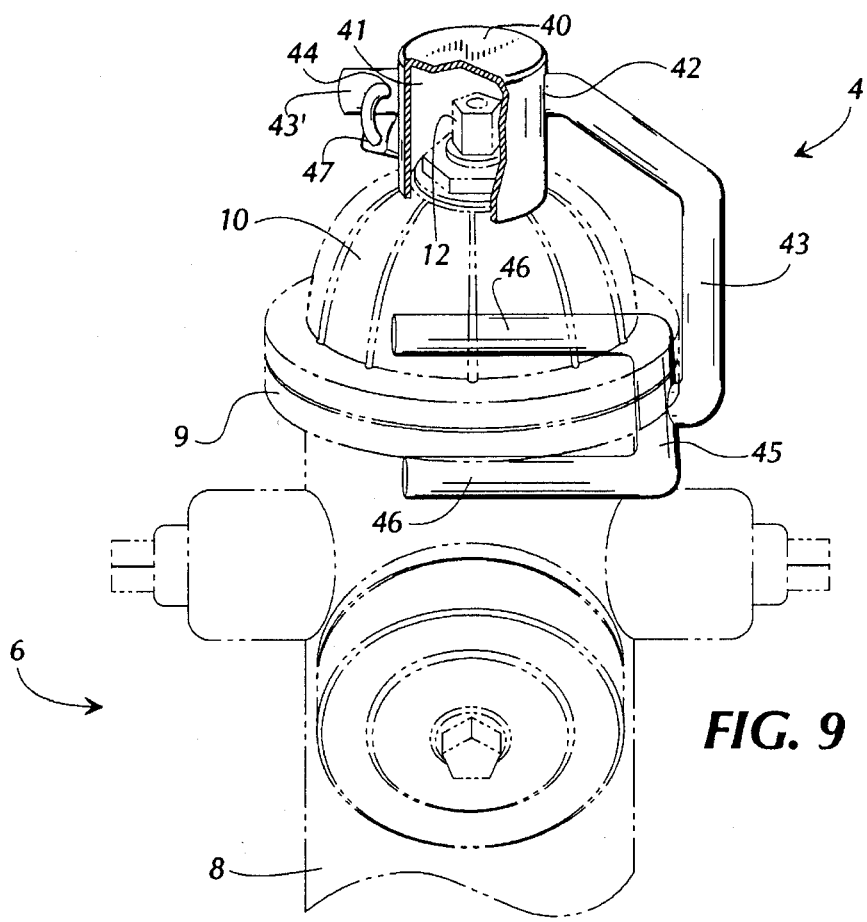
FIG. 9 is a perspective view in partial cut-away of a fourth fire hydrant locking device.
Figure 10:
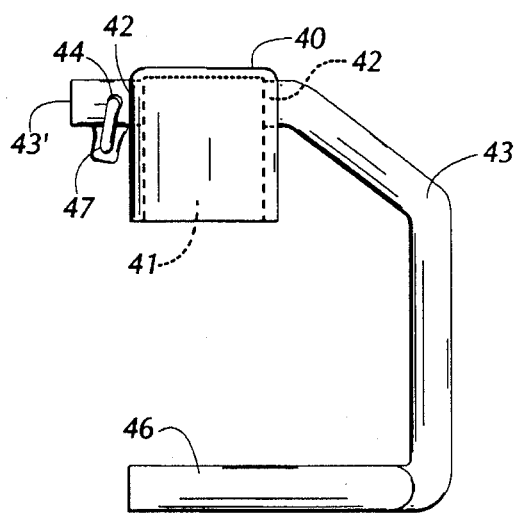
FIG. 10 is a side elevational view of the fire hydrant locking device illustrated in FIG. 9.
Figure 11:
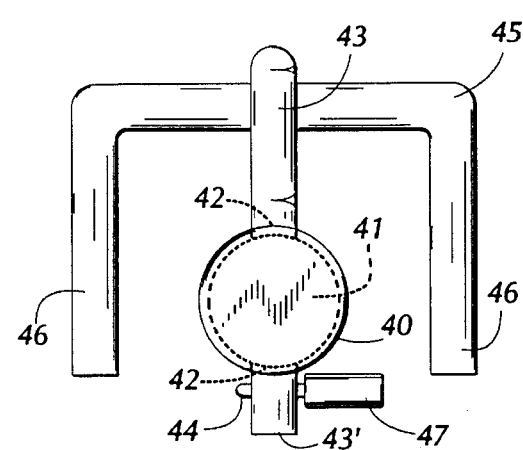
FIG. 11 is a top plan view of the fire hydrant locking device illustrated in FIG. 9.

A fourth embodiment of fire hydrant locking device 4 is illustrated in FIGS. 9 through 11. In FIG. 9, fire hydrant locking device 4 has an integrated arm and bracket assembly 43 which is received upon barrel 8 of fire hydrant 6, and extends through and secures cap 40 to bonnet 10 of fire hydrant 6. Still referring to FIG. 9, this embodiment of fire hydrant locking device 4 has a cap 40 with a hollow portion 41 formed therein for enclosing operating nut 12 on bonnet 10 of fire hydrant 6. However, and as best illustrated in FIGS. 10 and 11, cap 40 has two cap openings 42 formed therein and passing through the wall of cap 40 into hollow portion 41 along a common horizontal axial line for receiving the free end 43' of arm and bracket assembly 43.

As best shown in FIG. 9, arm and bracket assembly 43 is placed on fire hydrant barrel 8 under barrel mounting flange 9, while the free end 43' of arm and bracket assembly 43 extends through cap openings 42 into, through, and out of cap 40 whereupon lock 47 is secured to free end 43' of arm and bracket assembly 43 through lock hole 44. Once arm and bracket assembly 43 has been locked to cap 40, the opposed parallel legs 46 of arm and bracket assembly 43 are held against the underside of barrel mounting flange 9, and the free end 43' of arm and bracket assembly 43 is locked to cap 40 on bonnet, 10 of fire hydrant 6 so that fire hydrant locking device 4 cannot be removed from fire hydrant 6 until such time as lock 47 is removed from the free end of the arm and bracket assembly.

Figure 12:
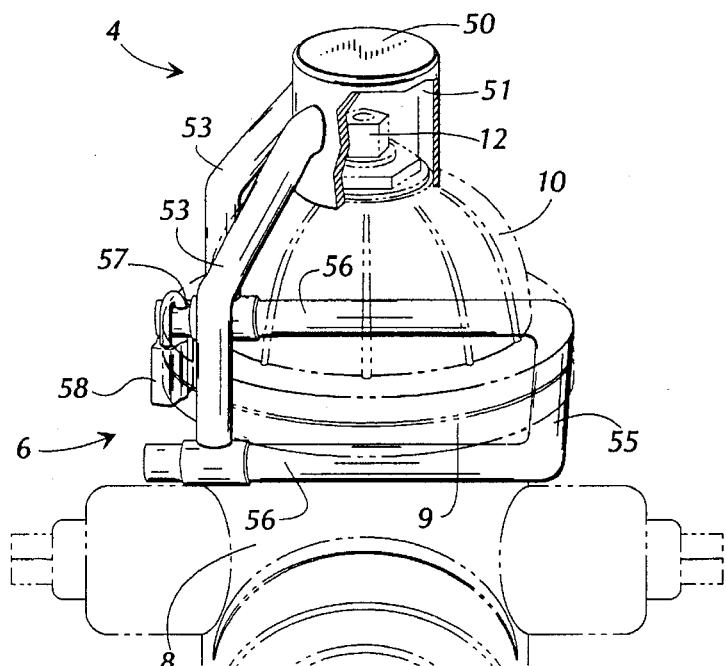
FIG. 12 is a perspective view in partial cut-away of a fifth fire hydrant locking device.
Figure 13:
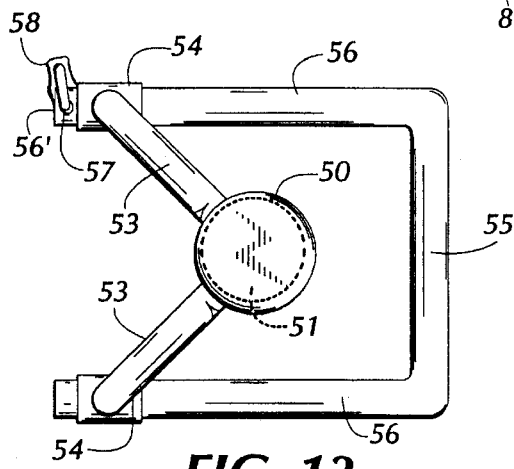
FIG. 13 is a top plan view of the fire hydrant locking device illustrated in FIG. 12.

Referring now to FIGS. 12 and 13, a fifth embodiment of fire hydrant locking device 4 is illustrated. As illustrated in FIG. 12, here fire hydrant locking device 4 has a cap 50, with a hollow portion 51 and encloses operating nut 12 on bonnet 10 of fire hydrant 6. A pair of spaced apart arms 53 are connected to cap 50 and extend downwardly over bonnet 10 toward barrel 8 of fire hydrant 6, passing over bonnet 10 and beyond barrel mounting flange 9. A socket 54 is formed or connected, in this instance welded, to the lower end of each arm 53. Each of sockets 54 is parallel to one another, and each socket 54 lies in a common horizontal plane.

As best illustrated in FIG. 13, this embodiment of fire hydrant locking device 4 has a rigid U-shaped bracket 55 having two opposed parallel legs 56, which are passed over barrel 8 of fire hydrant 6, below barrel mounting flange 9, and into sockets 54 for securing cap 50 and arms 53 to fire hydrant 6. This is also illustrated in FIG. 12. Once bracket 55 has been placed through sockets 54, lock 58 is passed through lock hole 57 defined in the free end 56' of one of legs 56 extending through and beyond one of sockets 54, for locking bracket 55 to arms 53 and cap 50.

Figure 14:
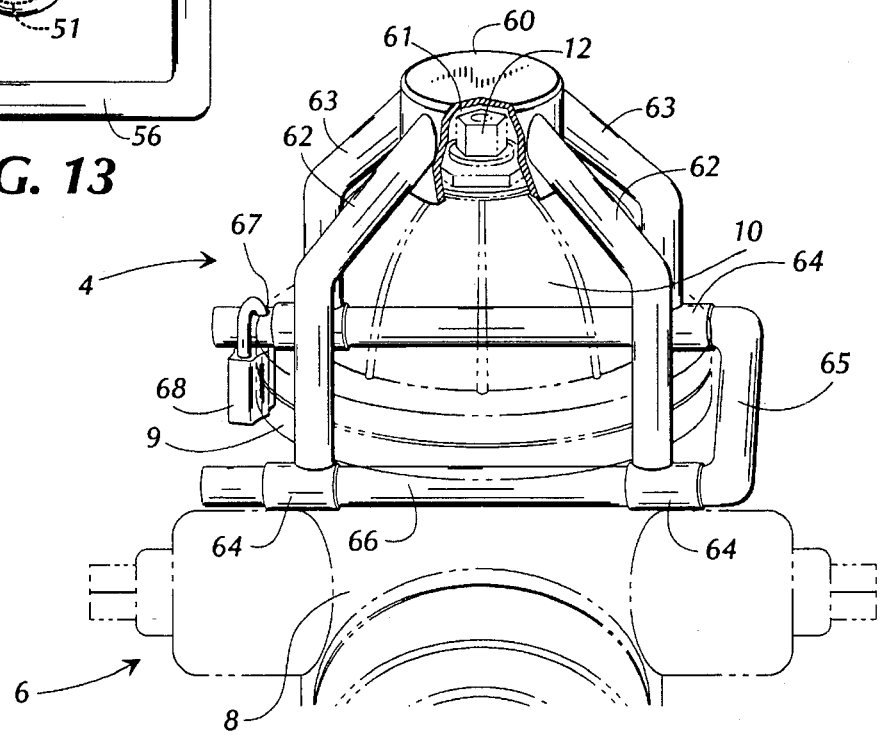
FIG. 14 is a perspective view in partial cut-away of a sixth fire hydrant locking device.

FIG. 14 illustrates a sixth embodiment of fire hydrant locking device 4. In this embodiment of fire hydrant locking device 4, a cap 60 having a hollow portion 61 is placed on the top surface of bonnet 10 for enclosing operating nut 12 against the bonnet.

Figure 15:
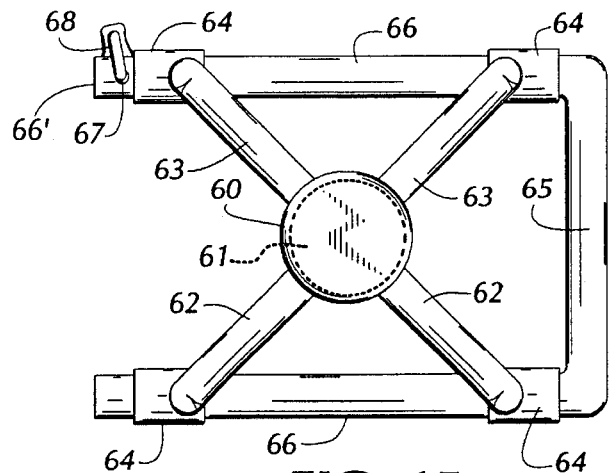
FIG. 15 is a top plan view of the fire hydrant locking device illustrated in FIG. 14.

Here, however, the locking device is equipped with a first pair of spaced apart arms 62, and a second pair of spaced apart arms 63, as best illustrated in FIG. 15. Still referring to FIG. 15, each arm in the first and second pairs of arms, 62 and 63 respectively, has a socket 64 connected to its lower end for receiving a rigid U-shaped bracket 65, having opposed parallel legs 66. As best shown in FIG. 15, sockets 64 of first pair of arms 62, and sockets 64 of the second pair of arms 63, each lie along a common axial line, as shown by leg 66 extending through each of sockets 64. Sockets 64 connected to the lower end of the first pair of arms 62 are parallel to sockets 64 connected to the lower end of the second pair of arms 63. Sockets 64 are welded to arms 62 and 63.

Referring now to FIG. 14, after cap 60 and arms 62 and 63 have been placed over operating nut 12 on bonnet 10 of fire hydrant 6, bracket 65 is passed over barrel 8 of fire hydrant 6, and below barrel mounting flange 9, through sockets 64 so that legs 66 extend through each of sockets 64. Once bracket 65 has been placed through sockets 64, lock 68 is placed through lock hole 67 in the free end 66' of one of legs 66, thereby securing fire hydrant locking device 4 to fire hydrant 6.

Figure 16:
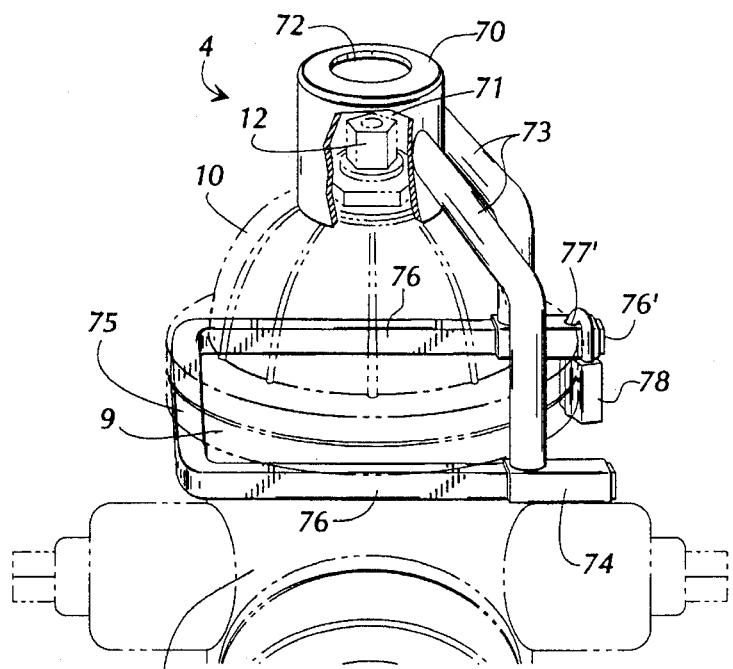
FIG. 16 is a perspective view in partial cut-away of a seventh fire hydrant locking device.

FIG. 16 shows yet another embodiment of fire hydrant locking device 4. In this seventh embodiment of the fire hydrant locking device, an apparatus similar to that illustrated in FIGS. 12 and 13 is shown, with the notable exception that cap 70 has an annular access opening 72 defined therein and passing therethrough so that operating socket 79, illustrated in FIG. 17B, can be passed downwardly through access opening 72 onto operating nut 12 for operating and thus charging fire hydrant 6 with water, while still securing operating nut 12 and its associated brass thrust collar (not illustrated) within cap 70 secured on the top of bonnet 10.

Figure 17A:
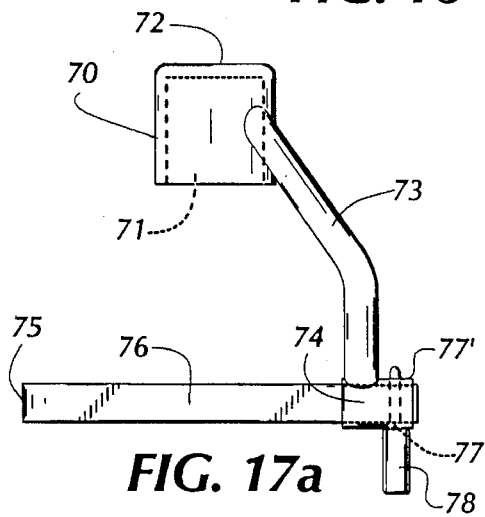
FIG. 17A is a side elevational view of the fire hydrant locking device illustrated in FIG. 16.

As illustrated in FIGS. 16 and 17, there is a cap 70 having a hollow portion 71 formed therein and placed over and enclosing operating nut 12 on bonnet 10 of fire hydrant 6. A pair of spaced apart legs 73 extend downward over bonnet 10 and below barrel mounting flange 9 and have sockets 74 connected to the lower ends of each leg 73. Bracket 75, a rigid U-shaped bracket having opposed parallel legs 76, which in this instance are rectangular in cross-section as illustrated in FIG. 17A, is then passed over the barrel 8 of fire hydrant 6, below barrel mounting flange 9, through sockets 74, where lock 78 is placed through lock hole 77' formed in the free end of one of legs 76, while also passing through lock hole 77 formed in socket 74, thus locking bracket 75 to sockets 74, as well as securing bracket 75 to arms 73 and cap 70.

Figure 17B:
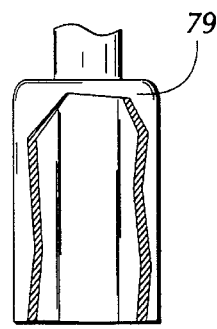
FIG. 17B is a side elevational view in partial cutaway of the socket used to turn the fire hydrant operating nut in conjunction with the fire hydrant locking device illustrated in FIG. 16.

Operating nut socket tool 79 illustrated in FIG. 17B is an otherwise conventional socket tool which is sized and shaped to be received by operating nut 12 and passed downward through access opening 72 within the top surface of cap 70. As with matching tool 39 of the third embodiment of the fire hydrant locking device, illustrated in FIGS. 8A through 8C, it is anticipated that operating nut socket tool 79 can be carried by municipal employees, or upon emergency vehicles which would properly have need to gain access to operating nut 12 and fire hydrant 6.

As disclosed above, in, the fourth, fifth, sixth and seventh embodiments of fire hydrant locking device 4, a rigid U-shaped bracket having opposed parallel legs is used to secure the cap and arms upon fire hydrant 6. It is understood by those skilled in the art that each of these brackets, bracket 45 of FIG. 9, bracket 55 of FIG. 12, Bracket 65 of FIG. 15, and bracket 75 of FIG. 16, are fabricated so that the legs of each bracket are spaced apart a distance greater than the breadth of barrel 8, and a distance less than the breadth of barrel mounting flange 9, to facilitate the locking action of fire hydrant locking device 4. Once placed over barrel 8 and below flange 9, and locked to the cap and arm or arms, the bracket, cap, and bonnet 10 of fire hydrant 6 cannot be removed until the lock holding fire hydrant locking device 4 together is removed. Brackets 44, 55, 65, and 75 cannot be otherwise removed from fire hydrant 6.

Figure 18:
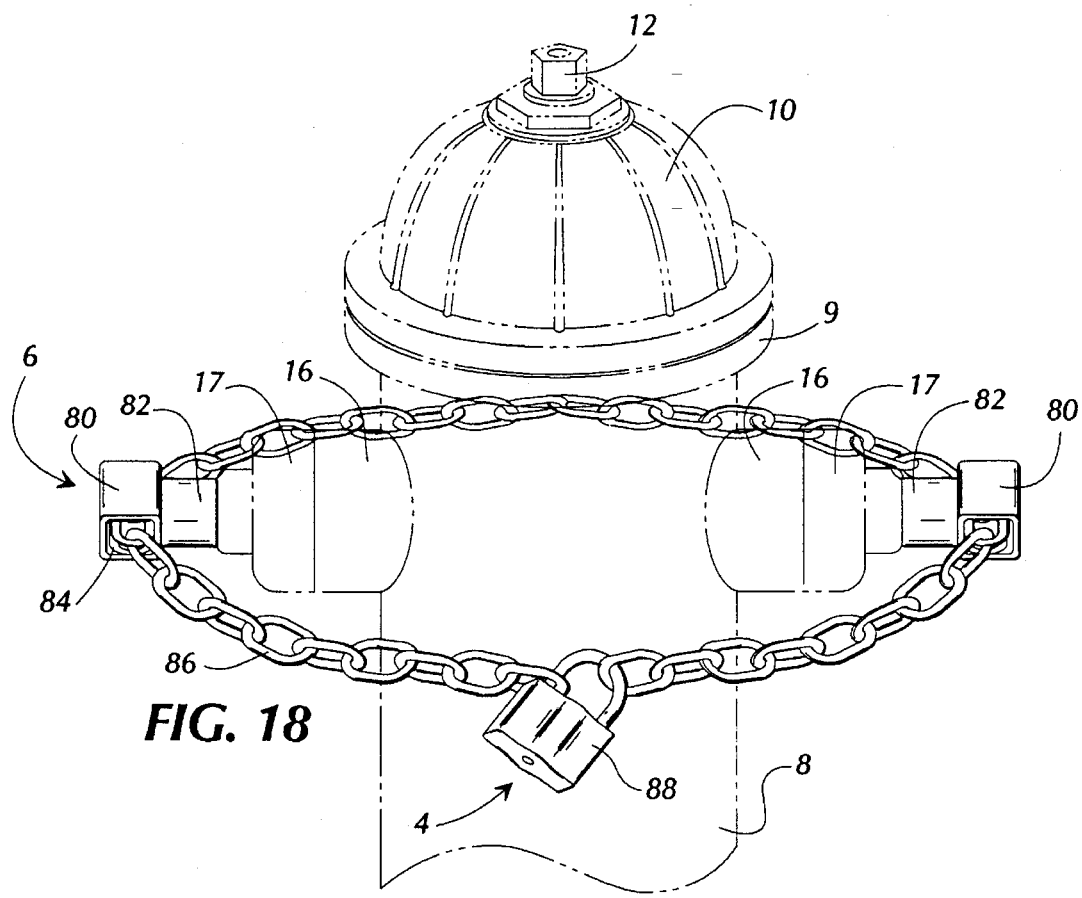
FIG. 18 is a perspective view of an eighth fire hydrant locking device.
Figure 19:
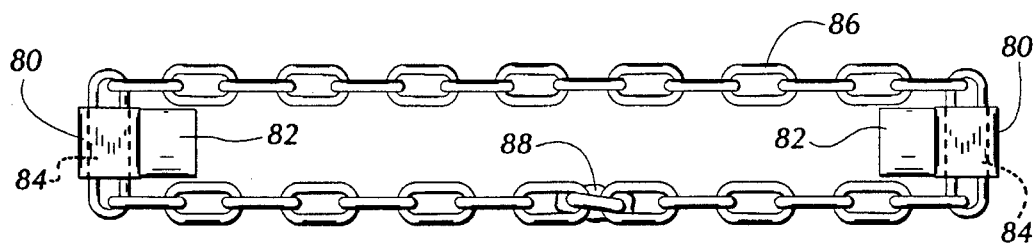
FIG. 19 is a top plan view of the fire hydrant locking device illustrated in FIG. 18.

FIGS. 18 and 19 illustrate an embodiment of the fire hydrant locking device 4 which secures outlet caps 17 upon fire hose outlets 16 of fire hydrant barrel 8. In this manner, whether operating nut 12 is protected by any one of the previous embodiments of fire hydrant locking device 4 disclosed herein, water cannot be taken from fire hydrant 6 as long as outlet caps 17 are secured or locked on fire hose outlets 16, which form part of barrel 8. This embodiment of the locking device can be used alone or in combination with any one of the earlier disclosed embodiments of this invention.

In those municipalities which have not suffered from problems with theft or vandalism of the brass thrust collar (not illustrated) securing operating nut 12 within the top of bonnet 10, this embodiment of fire hydrant locking device 4 could be used alone to ensure that fire system water is not otherwise taken and used for unauthorized or improper uses.

As shown in FIGS. 18 and 19, in this embodiment of fire hydrant locking device 4 a locking bracket 80, having an integral socket 82 formed therein, is sized and shaped to be removably received on turning nut 18 of outlet cap 17. Socket 82 is placed over and upon turning nut 18, and locking chain 86 is passed through passage 84 formed within locking bracket 80, circling the barrel of fire hydrant 6, with the loose ends of locking chain 86 held together by lock 88. Locking chain 86 is sized and shaped to be generally taut so that there is not sufficient slack in locking chain 86 to permit any one, or combination of, locking brackets 80 to be turned so that outlet caps 17 can be removed from barrel 8, thus opening fire hose outlets 16 through which water may be taken, or through which contaminants may be introduced into the fire water system under reverse pressure.

Locking bracket 80 is constructed of mild steel. Locking chain 86 is constructed of mild steel, or can be constructed of a chromium or hardened steel so that it cannot be easily cut. Lock 88 is a conventional lock, and can be either a key lock or a combination padlock.

Thus, it can be seen that the present invention comprises a useful and effective apparatus for locking or otherwise limiting access to municipal fire hydrants. While the invention has been shown and described as what is presently believed to be the most practical and preferred embodiments thereof, it will be apparent that modifications and variations within the scope and spirit of the disclosed embodiments are possible, and that the invention is to be afforded the interpretation so as to encompass all of the equivalents thereof, as set forth in the following claims.

I claim:

1. A locking device for a fire hydrant, the fire hydrant including an upright generally cylindrical barrel having a mounting flange at its upper end, a domed bonnet having a mounting flange fastened to the mounting flange of the barrel, and an operating nut protruding through the bonnet for operating a valve in the fire hydrant to permit water to charge the hydrant, comprising:

- a cap for placement over the protruding portion of the operating nut and enclosing the operating nut;
- at least one arm connected at one of its ends to said cap, said arm being sized and shaped to extend from said cap, when placed over the operating nut, downwardly and about the dome of the hydrant toward the barrel and passing downwardly beyond the mounting flange of the barrel;
- bracket means sized and shaped to removably receive said arm, said bracket means being adapted to be fastened to the mounting flange of the barrel, wherein a longitudinal passage is defined within said bracket means and passes therethrough, said passage being adapted to receive said arm therein;
- a generally horizontal tamper shield disposed on said arm, said tamper shield being sized and shaped to be received on said bracket means; and
- means for locking said arm to said bracket means so that said cap, said bracket means, and the bonnet of the fire hydrant cannot be removed from the fire hydrant when said locking means is locked.

2. The locking device of claim 1, wherein said bracket means further comprises a locking bracket bolted to the mounting flange of the bonnet and the mounting flange of the barrel, and wherein said arm is passed into said locking bracket.

3. The locking device of claim 1, wherein said arm extends downwardly beyond and through said bracket means, said locking means comprising a locking hole defined in the free end of said arm and passing therethrough, and a padlock received through said locking hole so that said arm cannot be removed from said bracket means while said padlock is upon said arm.

4. The locking device of claim 1, wherein said locking means further comprises a key operated lock assembly removably enclosed within said bracket means and selectively engaged on said arm so that said arm cannot be removed from said bracket means when said key operated lock assembly have been placed within said bracket means.

5. The locking device of claim 1, wherein said locking means further comprises a locking bolt threadedly received within said bracket means and engaged with said arm, wherein said locking bolt has a recessed and shaped opening defined in the head of said bolt so that said arm cannot be removed from said bracket means when said locking bolt has been installed therein.

6. The locking device of claim 5, further comprising a tool sized and shaped to be received with said recessed opening in said locking bolt for installing or removing said locking bolt.

7. The locking device of claim 1, further comprising:

- pair of arms connected to said cap and; spaced apart from each other, where each arm also has a socket connected to its end for receiving said bracket means, and where said sockets upon said arms are parallel to one another;
- a rigid U-shaped bracket having two parallel legs, said legs being spaced apart a distance greater than the breadth of the barrel, and a distance less than the breadth of the mounting flange of the barrel, and where the free end of at least one leg has a lock hole defined therein and passing therethrough; and
- a lock for locking said bracket to said arms;
- whereby said bracket is placed over the barrel, below the mounting flange of the barrel, extending through said sockets on said arms, and said lock is placed in said lock hole to secure the locking device to the fire hydrant.

8. The locking device of claim 1, further comprising:

- first pair of arms and a second pair of arms each connected at one of their ends to said cap and spaced apart from each other, each of said arms having a socket connected at its end for receiving said bracket means, wherein said sockets of each pair of arms lie along a common longitudinal axis and said sockets of said first pair of arms are parallel to said sockets of said second pair of arms;
- a rigid U-shaped bracket having two parallel legs, said legs being spaced apart a distance greater than the breadth of the barrel, and a distance less than the breadth of the mounting flange of the barrel, and where the free end of at least one leg has a lock hole defined therein and passing therethrough; and
- a lock for locking said bracket to said arms;
- whereby said bracket is placed over the barrel, below the mounting flange of the barrel, and extending through said sockets on said first and second pair of arms, and said lock is placed in said lock hole to secure the locking device to the fire hydrant.

9. The locking device of claim 1, further comprising an annular access opening defined within said cap above the operating nut,

- whereby the operating nut may be moved to charge the fire hydrant with water while said locking device secures said cap, said bracket means, and the bonnet to the fire hydrant.

10. The locking device of claim 9, further comprising an operating nut socket sized and shaped to pass through said access opening and adapted to be received on the operating nut.

11. A locking device for a fire hydrant, the fire hydrant having an upright generally cylindrical barrel, a mounting flange at the upper end of the barrel, a domed bonnet having a mounting flange fastened to the mounting flange of the barrel, and an operating nut protruding through the bonnet for operating a valve in the fire hydrant to permit water to charge the hydrant, comprising:

- a cap for placement over a protruding portion of the operating nut and enclosing the operating nut;
- an integral arm and bracket assembly, wherein an arm portion of said assembly is connected at one of its ends to a bracket portion of said assembly, the free end of said arm having a lock hole defined therein and passing therethrough adapted for receiving a lock, wherein said bracket portion of said assembly comprises a rigid U-shaped bracket having two parallel legs spaced apart from each other a distance greater than the breadth of the fire hydrant barrel, and a distance less than the breadth of the barrel mounting flange;
- a pair of openings defined within said cap sized and shaped to receive the free end of said arm, said openings being disposed along a common horizontal axis and being adapted for receiving said arm therethrough;
- a lock for locking said integral arm portion and bracket assembly to said cap;
- whereby the free end of said arm is extended through both of said openings within said cap, and said bracket portion is passed over the barrel, below the mounting flange of the barrel, and said lock is placed through said lock hole within the free end of said arm to lock said integral arm and bracket assembly to said cap upon the fire hydrant.

12. A locking device for a fire hydrant, the fire hydrant having an upright generally cylindrical barrel, a mounting flange at the upper end of the barrel, a domed bonnet having a mounting flange connected to the mounting flange of the barrel, and an operating nut protruding through the bonnet for operating a valve in the fire hydrant to permit water to charge the hydrant, comprising:

a cap for placement over a protruding portion of the operating nut and enclosing the operating nut;

an arm connected at one of its ends to said cap, said arm being sized and shaped to extend from said cap, when said cap is placed over the operating nut, downwardly and about the domed bonnet of the hydrant toward the barrel and passing downwardly beyond the barrel mounting flange;

a locking bracket sized and shaped to be fastened to the mounting flange of the bonnet and the mounting flange of the barrel, said locking bracket having a longitudinal passage defined therein for receiving the free end of said arm;

a generally horizontal tamper shield disposed upon said arm, said tamper shield being sized and shaped to be received upon said locking bracket;

means for locking said arm to said locking bracket;

wherein the free end of said arm extends through and beyond said locking bracket;

so that when said arm is passed into said locking bracket, said cap, said locking bracket, and the bonnet of the fire hydrant cannot be removed from the fire hydrant when said locking means is locked.

13. The locking device of claim 12, wherein said means for locking said arm comprises:

a locking hole defined within the free end of said arm and passing therethrough; and a padlock received through said locking hole so that said arm cannot be removed from said locking bracket while said padlock is upon said arm.

14. The locking device of claim 12, wherein said means for locking said arm comprises a key operated lock assembly removably enclosed within said locking bracket and selectively engaged upon said arm so that said arm cannot be removed from said bracket when said key operated locking assembly has been placed within said locking bracket.

15. The locking device of claim 12, wherein said means for locking said arm comprises:

a locking bolt threadedly received within said locking bracket engaged with said arm, wherein said locking bolt has a recessed and shaped opening defined in the head of said bolt;

a tool sized and shaped to be received within said recessed opening in said locking bolt for installing or moving said locking bolt;

wherein said arm cannot be removed from said locking bracket when said locking bolt has been installed therein.

16. A locking device for a fire hydrant, the fire hydrant having an upright generally cylindrical barrel, a mounting flange at the upper end of the barrel, a domed bonnet having a mounting flange for connection to the mounting flange of said barrel, and an operating nut protruding through the bonnet for operating a valve in the fire hydrant to permit water to charge the hydrant, comprising:

a cap for placement over a protruding portion of the operating nut and enclosing the operating nut;

at least two arms connected to said cap, said arms being spaced apart from each other and being sized and shaped to extend from said cap, when placed over the operating nut, downwardly and about the dome of the hydrant toward the barrel and passing downwardly beyond the mounting flange of the barrel;

bracket means sized and shaped to removably receive said arms, wherein said bracket means is sized and shaped to be removably supported by the mounting flange of the barrel;

a socket connected to the end of each arm for receiving said bracket means, where said sockets upon said arms are parallel to one another;

a padlock for locking said bracket to said arms;

whereby said bracket is placed over the barrel, below the mounting flange of the barrel, extending through said sockets on said arms, and said bracket is locked to said arms to secure the locking device to the fire hydrant.

17. The locking device of claim 16, wherein said bracket means comprises:

a rigid U-shaped bracket having two parallel legs, said legs being spaced apart a distance greater than the breadth of the barrel, and a distance less than the breadth of the mounting flange of the barrel, and where the free end of at least one leg has a lock hole defined therein and passing therethrough for receiving said lock.

18. The locking device of claim 17 further comprising a first pair of arms and a second pair of arms connected to said cap and spaced apart from each other, where said sockets of each pair of arms lie along a common longitudinal axis and where said sockets of said first pair of arms are parallel to said sockets of said second pair of arms.

19. The fire hydrant locking device of claim 17, further comprising an annular access opening defined within said cap above the operating nut, and passing therethrough;

an operating nut socket sized and shaped to pass through said access opening to be received by the operating nut;

whereby the operating nut may be turned to charge the fire hydrant with water while said locking device secures said cap, said bracket means, and the fire hydrant bonnet to the fire hydrant.

* * * * *